United States Patent [19]
Buhl et al.

[11] Patent Number: 6,143,810
[45] Date of Patent: Nov. 7, 2000

[54] METHOD FOR THE APPARATUS OF CONDUCTIVE CURABLE POLYESTER MOULDING COMPOUNDS

[75] Inventors: Dieter Buhl, Frankenthal; Heinz Fuerst, Eisenberg; Harald Schneider, Urmitz, all of Germany; Jan Visser, Emmen, Netherlands; Joachim Zwecker, Weinheim, Germany

[73] Assignee: DSM N.V., Heerlen, Netherlands

[21] Appl. No.: 09/274,690

[22] Filed: Mar. 24, 1999

[30] Foreign Application Priority Data

Mar. 24, 1998 [EP] European Pat. Off. ............. 98200924

[51] Int. Cl.⁷ ............................. C08K 3/40; C08L 29/04; C08L 31/04
[52] U.S. Cl. ......................... 523/526; 523/527; 524/494; 524/503; 524/513; 524/523; 524/524
[58] Field of Search ..................................... 524/494, 503, 524/513, 523, 524; 523/526, 527

[56] References Cited

U.S. PATENT DOCUMENTS 5,094,797  3/1992  Hel et al. ................................ 264/349

FOREIGN PATENT DOCUMENTS

| 387 419 | 9/1990 | European Pat. Off. . |
| 419 977 A2 | 4/1991 | European Pat. Off. . |
| 2 238 733 | 2/1975 | France . |
| 1457157 | 12/1976 | United Kingdom . |

*Primary Examiner*—Kriellion Sanders
*Attorney, Agent, or Firm*—Pillsbury Madison & Sutro

[57] ABSTRACT

The invention relates to a process for preparing a conductive curable moulding compound with reduced electrical surface resistance, comprising mixing together an unsaturated polyester resin, a thermoplastic polymer, a conductive paste and optionally a filler, and is characterized in that the conductive paste is obtained by dispersing conductive pigment particles in a solution of a thermoplastic polymer in a suitable solvent. The invention further relates to the conductive paste itself and to mouldings having reduced surface resistance, obtained therefrom.

4 Claims, No Drawings

METHOD FOR THE APPARATUS OF CONDUCTIVE CURABLE POLYESTER MOULDING COMPOUNDS

The invention relates to a method for the preparation of conductive curable polyester moulding compounds which contain an unsaturated polyester, copolymerizable monomers, a thermoplastic polymer and a conductive pigment.

Mouldings for use in the field of electronics should possess sufficient electrical conductivity. In other areas such as in the automotive industry, electrical conductivity may also be desirable. Besides having this desirable property, mouldings should preferably also have good fire retardant properties.

For the manufacture of pigmented mouldings, it is common practice to prepare a concentrate of pigment particles in monomer-free saturated or unsaturated polyesters, for instance by melt-mixing, and subsequently admixing this concentrate with unsaturated polyester resins, from which sheet moulding compounds (SMCs) or bulk moulding compounds (BMCs) are prepared. EP-A 419 977 for instance describes a process for the preparation of pigmented, curable moulding compounds wherein pigment particles are dispersed in a thermoplastic melt with the aid of an extruder, whereafter the formed concentrate is dissolved in styrene and processed into an SMC with an unsaturated polyester resin.

In an attempt to prepare SMCs for conductive mouldings in this way, using conductive pigment particles instead of the usual pigment particles, it appeared to be impossible to obtain the desired high level of conductivity without impairing other desirable properties. More in particular it turned out to be impossible not to exceed the viscosity level of the resin paste required for good processability at the required high proportions of conductive pigment particles. It also proved impossible to obtain conductive mouldings without deterioration of the surface properties of the mouldings. Moreover most of the conductivity is lost during the extrusion step, and/or undesirable anisotropy occurs as a result of this.

The aim of the present invention therefore is to provide a moulding compound for the manufacture of conductive, preferably flameproof mouldings of fibre-reinforced unsaturated polyester resins having excellent surface smoothness.

This objective is achieved by a process for preparing a conductive curable moulding compound comprising mixing together A. an unsaturated polyester resin, and
B. a thermoplastic polymer, in a weight ratio A:B of 0.4 to 10, the total of A and B being 100 parts by weight (pbw),
C. 10–60 pbw of a conductive paste,
D. 0–450 pbw of a filler,
E. 0.2–4 pbw of a radical initiator, as well as
F. optionally further customary additives, characterised in that, the conductive paste C is obtained by preparing a solution of a thermoplastic polymer G in a suitable solvent H, and dissolving conductive pigment particles in said solution.

By preparing the conductive paste according to the invention the dispersion of the conductive pigment particles in a moulding compound containing the conductive paste is unexpectedly improved.

An additional advantage of the method of the invention is that conductive curable moulding compounds of low-shrinkage (LS) and/or low-profile (LP) type can be obtained with unprecedented conductivity, providing mouldings with a very smooth surface (preferably Class A) and high conductivity simultaneously.

The following remarks concern the individual components of the moulding compound according to the invention:

A. Unsaturated polyester (UP) resins are solutions of unsaturated polyesters in copolymerizable monomers, preferably in styrene. Suitable unsaturated polyesters are the usual condensation products of polybasic, in particular dibasic carboxylic acids and their esterifiable derivatives, in particular their anhydrides, which are bonded in the way of an ester with polyhydric, in particular dihydric alcohols, and which may additionally contain residues of monobasic carboxylic acids or monohydric alcohols, with at least part of the starting materials being provided with ethylenically unsaturated, copolymerizable groups. Preferred unsaturated polyesters are those on the basis of maleic anhydride and orthophthalic acid or isophthalic acid, on the one hand, and propylene glycol, ethylene glycol, diethylene glycol and/or dipropylene glycol on the other. If minor amounts of dicyclopentadiene have been incorporated in the UP resin during the condensation process, the viscosity of the resin will be lower. Another preferred class of UP resins are the unsaturated vinyl ester resins. Unsaturated vinyl ester resins (epoxy-acrylates) are addition products of polyepoxides with unsaturated monocarboxylic acids, preferably methacrylic acid. Vinyl ester resins based on (optionally alkoxylated) bisphenol A are preferred over those based on epoxy novolak.

B. The moulding compound contains, relative to 100 pbw of UP resin, 10 to 250 pbw, preferably 10 to 100 pbw, more preferably 20 to 80 pbw of a thermoplastic polymer. The thermoplastic polymer is added to control the polymerisation shrinkage of the UP resin. Dependent on the particular shrinkage control achieved one speaks of LS-systems (linear shrinkage more than 0.05%) and of LP-systems (linear shrinkage equal to or less than 0.05%). The thermoplastic polymer B can be any thermoplastic known to be able to control the UP resin polymerisation shrinkage. Suitable thermoplastics are for instance vinylaromatic polymers, such as polystyrene, polyolefinic polymers, such as polyethylene, acrylic-based polymers, such as polymethylmethacrylate, polyvinyl acetate polymers, saturated polyesters, and/or dual-thickening systems containing isocyanate prepolymers, and combinations thereof. Preferred are saturated polyesters based on adipic acid (optionally replaced up to 30 wt. % by other saturated dicarboxylic acids) on the one hand, and ethylene glycol, propylene glycol, diethylene glycol and/or dipropylene glycol (optionally replaced up to 30 wt. % by other diols) on the other. The molecular weight $M_n$ of the saturated polyesters is preferably between 1000 and 10,000. Up to 50%, preferably 5 to 40%, of the weight of the saturated polyester may be replaced by other thermoplastics, such as polymethylmethacrylate, polyvinylacetate and/or polystyrene. It is useful to apply component B in the form of a solution in a monomer that copolymerizes with A, e.g. styrene; it has proved to be advantageous if the viscosity of the solution at 23° C. is lower than 3000 mPa.s, preferably lower than 500 mPa.s.

C. The moulding compound comprises 10 to 60, preferably 20 to 50 pbw of the conductive paste relative to 100 pbw of the total of UP resin and thermoplastic polymer (components A and B). The conductive paste according to the invention contains 1–50 pbw, preferably 3–25 pbw, most preferably 8–15 pbw of conductive pigments and/or conductive powders relative to 100 pbw of conductive paste. Preferably conductive carbon black is used. Conductive carbon black is available in the form of aggregates or agglomerates. Suitable conductive carbon blacks are for instance structured Furnace- and/or Acetylene carbon blacks, with specific BET-surfaces of between 250 and more than 1000 m²/g. Also suitable are dotated carbon blacks. Commercially available carbon blacks to be used in the conductive paste of the invention are for instance Printex™ L6 and Printex™ EX2 from Degussa, and/or Katjen Black™ from Akzo. Minor amounts of the carbon black may be replaced by conductive metals, e.g. aluminium powder, or by graphite.

D. Suitable fillers are for example customary finely pulverulent or granular inorganic fillers, such as chalk, calcium carbonate, kaolin, quartz powder, dolomite, baryte, metal powders, hydrated alumina, cement, talc, diatomaceous earth, sawdust, wood chips and the like. They are present in the moulding compound in amounts of 0 to 600 pbw, preferably 30 to 450 pbw, based on the total weight of UP resin and thermoplastic polymer (components A and B). In order to ensure flameproof properties, the resin paste preferably comprises aluminium oxide trihydrate, $Al_2O_3.3H_2O$, as a filler.

E. The moulding compound comprises 0.2 to 4, preferably 0.5 to 3 pbw of a radical initiator, preferably an organic peroxide, which decomposes into radicals, preferably in the range from 60 to 120° C., and is capable of initiating the polymerisation of the UP resin.

F. Suitable further customary additives are well known to the person skilled in the art of preparing moulding compounds. Suitable examples are e.g. reinforcing fibres, inhibitors and thickening agents. Suitable reinforcing fibres are inorganic and organic fibres in the form of rovings or in the form of sheetlike structures, possibly woven therefrom, such as mats, made for example of glass, carbon, asbestos, cellulose and synthetic organic fibres such as polyethylene, polycarboxylic esters, polycarbonates and polyamides. They are preferably present in the moulding compound in amounts of 10 to 65% by weight, based on the total weight of the moulding compound. Suitable inhibitors are phenolic compounds, such as (substituted) hydroquinone, pyrocatechol, tert-butylpyrocatechol, ring-substituted pyrocatechols, quinones, such as benzoquinone, naphtoquinone, chloranil, nitrobenzenes, such as m-dinitrobenzene, thiodiphenylamine, N-nitroso compounds, such as N-nitrosodiphenylamine, and salts of N-nitroso-N-cyclohexylhydroxylamine, and also mixtures thereof. Suitable additional stabilizers include salts of divalent copper, for example cupric naphtenate or octoate, and quaternary ammonium salts. The inhibitors are preferably present in the moulding compound in amounts of 0.005 to 0.5% by weight, based on the total weight of components A and B. The thickening agents used are oxides or hydroxides of lithium, magnesium, calcium, aluminium or titanium. Preference is given to magnesium oxide and/or magnesium hydroxide. The thickening agents are preferably present in the moulding compound in amounts of 0.2 to 5% by weight, based on the total weight of components A and B. Other possible customary additives are lubricants, such as zinc stearate, magnesium stearate, calcium stearate and also polyalkylene ether waxes, paraffin's, curing accelerants, for example octoates or naphtenates of copper, lead, calcium, magnesium, cerium and in particular of manganese and cobalt, and aromatic amines, such as dimethylaniline and diethylaniline, and thickening accelerants, for example ammonium chlorides, phosphonium chlorides, sulfonium halides, water, polyols and 1,2-propanediol.

G. Suitable thermoplastics to be used in the method for preparing the conductive paste according to the invention are all thermoplastic polymers mentioned above as suitable thermoplastic polymers B. Preferably thermoplastic polymer G has similar properties as component B. More preferably thermoplastic polymer G is the same polymer as component B. Preferred polymers G are therefore thermoplastic saturated polyesters. More preferred are saturated polyesters based on adipic acid (optionally replaced up to 30 wt. % by other saturated dicarboxylic acids) on the one hand, and ethylene glycol, propylene glycol, diethylene glycol and/or dipropylene glycol (optionally replaced up to 30 wt. % by other diols) on the other. The molecular weight $M_n$ of the saturated polyesters is preferably between 1000 and 10,000. Up to 50%, preferably 5 to 40%, of the weight of the saturated polyester is preferably replaced by other thermoplasts, such as polymethylmethacrylate, polyvinylacetate or polystyrene.

H. Suitable solvents H are all solvents in which the thermoplastic polymer G is readily soluble. Preferably solvent H is a monomer that copolymerizes readily with component A, e.g. styrene. It has proved to be advantageous if the viscosity of the solution of thermoplastic G in solvent H at 23° C. is lower than 2000 mPa.s, preferably lower than 500 mPa.s.

The conductive paste according to the invention is prepared by first forming a solution of 10–60 wt-%, preferably 25–45 wt.-%, of thermoplastic polymer G in 90–40 wt.-%, preferably 75–55 wt.-% of solvent H. The wt.-% are based on the total weight of G and H. Thereafter 20–80 pbw conductive pigment particles are dissolved in 80–20 pbw of the formed solution by usual mixing. Preferably 0.5–5 pbw of a wetting agent and 1–10 pbw of a viscosity depressant are added as well. Further customary additives may be added such as those described above as component F (inhibitors, stabilisers and so on). Suitable wetting agents are the customary wetting agents used in the art, such as e.g. the high molecular weight block copolymers sold by Byk. They are added to improve fibre wetting and/or depress demixing and agglomeration of pigment particles. Suitable viscosity depressants are the customary viscosity depressants used in the art. Preferred are those based on saturated polyesters with acidic groups and/or their solutions, or those based on stearic and/or palmitic acid.

A typical manufacturing process for the conductive paste according to the invention and using a dissolver is given below although by no means meant to be limiting. The thermoplastic polymer solution (components G and H) is poured into a mixing vessel which has preferably a diameter 1.35–2.00 times the size of the disc of the dissolver to be used. Subsequently, all other liquid components (viscosity depressants, inhibitors, stabilisers, etc.) are added to the mixing vessel while stirring slowly. Conductive pigment particles are then added to the mixing vessel using a dissolver working preferably at 600–1000 rpm. Subsequently the conductive pigment particles are dispersed further for about 30–45 min at dissolver speeds of 600–1000 rpm preferably, eventually adding small amounts of viscosity depressant in order to adjust and/or fine-tune the conductive paste viscosity.

The formed conductive paste preferably has a viscosity of 10.000 to 60.000 mPa.s at 23°C., and a density of 0.8 to 1.2 g/cm³. Although the paste is thixotropic, it is readily pumpable and can easily be added to the other components of the moulding compound by using a metering unit.

The conductive paste according to the invention is easily mixed with the other components of the polyester resin in a conventional manner. The components are mixed in a conventional mixing apparatus, for example in a stirred vessel or blade mixer. The resin paste thus obtained is then used to impregnate glass fibres for instance.

The components of the moulding compound are preferably present in such amounts that the compound has a viscosity at 23° C. of 10,000 to 120,000 mPa.s, preferably of 30,000 to 90,000 mPa.s. In this way the glass fibres can be wetted to a sufficient degree, while moldability of the compound is retained. The viscosity can easily be controlled by selecting the type and amount of UP resin A, the thermoplastic B and the amount of solid matter added. Also, for the purpose of lowering the viscosity, styrene and/or viscosity reducing agents can be added. Articles made from a moulding compound, comprising the conductive paste according to the invention, show a surprisingly good surface quality, comparable to what would be achieved by moulding LS- and LP-compounds not containing the conductive paste. The conductive articles and moulding compound according to the invention preferably have an electrical surface resistance according to DIN 53482 of $10^3$–$10^9$ Ohm, and preferably even below $10^7$ Ohm.

The SMC's or BMC's are prepared with application of the known methods. In the case of SMC's, 0.5 to 5 pbw, relative to 100 pbw of UP resin A and thermoplastic polymer B, of a thickening agent, preferably magnesium oxide or magnesium hydroxide, are admixed with the resin paste, whereby the process of thickening is started. Next, the reinforcing fibres are added. Advantageously, this is done by sprinkling 3 to 55 mm long chopped glass fibres on a running conveyor belt carrying the thickening resin paste and working these into the mass with the aid of an impregnation device. In principle, it is also an option to impregnate a prefabricated glass fibre mat with the resin paste. The amount of glass fibres applied is preferably 10 to 65 wt. %, relative to the weight of the moulding compound. After that, thickening is completed, which process can be accelerated by raising the temperature to between 30 and 60°C., or decelerated by cooling below room temperature.

In the preparation of BMCs, chopped fibres are wetted with the resin paste in kneading or agitating devices. Moulding compounds can also be obtained by pultrusion, involving the impregnation of continuous rovings with the resin paste according to the invention in impregnation baths.

The moulding compounds obtained according to the invention can be moulded by compression moulding, deep-drawing, injection moulding, pultrusion, resin transfer moulding and/or draw die moulding and cured by heating to temperatures of preferably 80 to 180° C.

A particularly preferred conductive moulding comprises
10 to 20 wt. % of cured polyester resin,
1 to 20 wt. % of a thermoplastic polyester, optionally replaced up to 50% of its weight by another thermoplastic polymer,
0.5 to 3 wt. % of conductive pigment particles,
5 to 70 wt. % of fillers,
0.1 to 2 wt % of magnesium oxide and/or magnesium hydroxide,
10 to 65 wt. % of glass fibres,
and has an electrical surface resistance according to DIN 53482 of $10^3$–$10^7$ Ohm. Moreover its viscosity at 23° C. is preferably between 40.000 and 120.000 mPa.s.

The mouldings according to the invention can be used for instance for storage purposes in the electronics sector, as electronic engineering components, as well as in the automotive and railway vehicle construction sectors. They are particularly useful in applications where a very smooth surface (Class A) must be obtained together with high conductivity.

The invention will now be illustrated further by the following examples, without being limiting in any way to the scope of the invention as claimed.

EXAMPLES I–II

The compositions prepared in all Examples contain the following components (in pbw):

| | |
|---|---|
| A | a 64% solution in styrene of an unsaturated polyester of maleic acid, orthophthalic acid, propylene glycol, diethylene glycol and dipropylene glycol (Palatal P 172-01, from DSM-BASF Structural Resins); |
| B | a 35% solution in styrene of a mixture of 20% of polymethylmethacrylate and 80% of a saturated polyester of adipic acid, ethylene glycol and propylene glycol in a molar ratio of 1:0,6:0,4; |
| C | a conductive paste prepared as described below; |
| D1 | calcium carbonate (Millicarb ™ from Omya); |
| D2 | aluminium-trihydrate (Martinal ™ ON921, from Martinswerk) |
| E | tert.butylperbenzoate; |
| F1 | zinc stearate; |
| F2 | inhibitor (BC500 from Akzo); |
| F3 | a thickening paste (35% by weight of magnesium oxide in 65% by weight of unsaturated polyester) |
| F4 | a viscosity reducer; |
| F5 | styrene; |
| F6 | 25% by weight, relative to the total moulding compound weight of 26 mm long glass fibre rovings; |

Preparation of the conductive paste 90 pbw of a 35% solution in styrene (component H) of a mixture of 20 wt % of polymethylmethacrylate and 80 wt % of a saturated polyester is brought into a mixing vessel. To this solution are then added under continuous slow stirring the usual processing aids, such as a wetting agent (Byk W-972), a viscosity depressant (Byk 996) and styrene, and a minute amount of inhibitor (0.02 pbw). Thereafter 10 pbw of conductive carbon black pigment particles (Printex™) are added to the mixing vessel using a dissolver with a disc size of about half the mixing vessel diameter. The dissolver operates at about 600 rpm. After stirring for 30–45 min. a mixture was obtained with a viscosity of about 40.000–80.000 mPa.s.

Preparation of the moulding compounds

Example I

To 85 pbw of a mixture of components A and B, were added in the usual manner at room temperature: 44 pbw of the conductive paste C, obtained as described above, 360 pbw of aluminium trihydrate D2, 5 pbw of a thickening paste F3, as well as the other additives E (1.5 pbw), F1 (3 pbw), F2 (0.5 pbw), F4 (10 pbw), F5 (8 pbw), and 25% by weight, relative to the weight of the total moulding compound, of 26 mm long glass fibre rovings (F6). After 5 days of thickening-maturation the compounds were cured by compressing them into rectangular plates for 3 minutes at 145° C.

Example II

To 75 pbw of a mixture of components A and B, were added in the usual manner at room temperature: 33 pbw of the conductive paste C, obtained as described above, 230 pbw of calcium carbonate D1, 2.5 pbw of a thickening paste F3, as well as the other additives E (1.5 pbw), F1 (2.5 pbw), F2 (0.6 pbw), F4 (1.0 pbw), F5 (3 pbw), and 28% by weight, relative to the weight of the total moulding compound, of 26 mm long glass fibre rovings (F6). After 5 days of thickening-maturation the compounds were cured by compressing them into rectangular plates for 3 minutes at 145° C.

Measurement of Properties

The mouldings obtained were subsequently subjected to electrical conductivity measurements, according to DIN 53482. Measurements of electrical surface resistance values were carried out on 10 locations of the plates, regularly spaced over the surface of front and back side. From these readings the average surface resistance of one plate surface was calculated. In addition to this measurement, a visual assessment was carried out.

| Experiment | Electrical Surface Resistance (Ohm) | Fire Retardant Properties | Visual assessment |
| --- | --- | --- | --- |
| I (Fire retardant) | $10^5$ (front side) $10^5$ (back side) | B1 class (DIN 4102) LOI: 100% (ASTM D2863) Caloric value: 5000 kJ/kg (DIN 51900) | black colour; high gloss surface; low porosity surface |
| II (Class A) | $10^4$ (front side) $10^4$ (back side) | — | black colour; low porosity surface; shrinkage 0 to positive; Class A surface |

The plates on the basis of the conductivity paste of the invention show a high surface gloss, low long term and short term waviness, and a uniform high level of conductivity.

What is claimed is:

1. A process for preparing a conductive curable moulding compound with reduced electrical surface resistance, comprising mixing together A. an unsaturated polyester resin, and B. a thermoplastic polymer, in a weight ratio A:B of 0.4 to 10, the total of A and B being 100 parts by weight (pbw)

C. 10–60 pbw of a conductive paste,

D. 0–450 pbw of a filler,

E. 0.2–4 pbw of a radical initiator, as well as

F. optionally further customary additives, characterised in that, the conductive paste C is obtained by preparing a solution of a thermoplastic polymer G in a suitable solvent H, and dispersing conductive pigment particles in said solution.

2. Process according to claim 1, characterised in that thermoplastic polymer G is selected from vinylaromatic polymers, polyolefinic polymers, acrylic-based polymers, polyvinyl acetate polymers, saturated polyesters and combinations thereof, and solvent H is a monomer copolymerizable with unsaturated polyester A.

3. Conductive paste, obtainable by dispersing 3–25 pbw of conductive pigment particles in 97–75 pbw of a solution of 10–60 wt-% of a thermoplastic polymer G in 90–40 wt.-% of a suitable solvent H, the wt.-% being based on the total weight of G and H, optionally adding 0.5–5 pbw of a wetting agent, 1–10 pbw of a viscosity depressant and small amounts of other usual additives.

4. Article obtained by moulding a curable unsaturated polyester compound, comprising 10 to 20 wt. % of cured polyester resin;

2 to 20 wt. % of a saturated polyester, optionally replaced up to 50 wt. % of its weight by another thermoplastic polymer;

0.5 to 3 wt. % of conductive pigment particles;

5 to 65 wt. % of fillers;

0.1 to 2 wt % of a thickening agent;

10 to 65 wt. % of glass fibres; and having an average electrical surface resistance (determined according to DIN 53482) of $10^3$–$10^9$ Ohm.

* * * * *